United States Patent
Powell

(10) Patent No.: US 10,068,243 B2
(45) Date of Patent: Sep. 4, 2018

(54) METHOD AND SYSTEM FOR PROCESSING A DISCOUNT

(71) Applicant: MasterCard International Incorporated, Purchase, NY (US)

(72) Inventor: Jonathan Robert Powell, Rye Brook, NY (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 911 days.

(21) Appl. No.: 14/547,872

(22) Filed: Nov. 19, 2014

(65) Prior Publication Data

US 2015/0142546 A1 May 21, 2015

Related U.S. Application Data

(60) Provisional application No. 61/906,582, filed on Nov. 20, 2013.

(51) Int. Cl.
*G06Q 30/02* (2012.01)
*G06Q 20/40* (2012.01)
*G06Q 20/38* (2012.01)

(52) U.S. Cl.
CPC ....... *G06Q 30/0222* (2013.01); *G06Q 20/387* (2013.01); *G06Q 20/40* (2013.01)

(58) Field of Classification Search
CPC ..... G06Q 30/00; G06Q 30/0253; G06Q 30/02
USPC ............................................ 705/14.17, 14.23
See application file for complete search history.

(56) References Cited

U.S. PATENT DOCUMENTS

| | | |
|---|---|---|
| 8,682,791 B2 | 3/2014 | Bies et al. |
| 2005/0075978 A1 | 4/2005 | Leavitt et al. |
| 2006/0116956 A1 | 6/2006 | Leavitt et al. |
| 2008/0133350 A1 | 6/2008 | White et al. |
| 2012/0221468 A1 | 8/2012 | Kumnick et al. |
| 2012/0278151 A1 | 11/2012 | Galit |

(Continued)

FOREIGN PATENT DOCUMENTS

WO    00/21004 A1    4/2000

OTHER PUBLICATIONS

EP Extended Search Report and Search Opinion, Application No. 14863664.0, dated Jun. 6, 2017, 7 pps.

(Continued)

*Primary Examiner* — Marilyn G Macasiano
(74) *Attorney, Agent, or Firm* — Armstrong Teasdale LLP

(57) ABSTRACT

A computer-implemented method for processing a discount is described. The method is implemented using a payment processor computing device associated with a payment network. The method includes receiving, at the payment processor computing device, from a discount module computing device, a notification of an adjusted authorization amount for a transaction, wherein the notification is received by the discount module computing device from an intercept node computing device at the time a cardholder makes a purchase. The method also includes receiving, at the payment processor computing device, an authorization request message including a non-adjusted authorization amount for the transaction, replacing the non-adjusted authorization amount with the adjusted authorization amount in the authorization request message, and transmitting the authorization request message to an issuer computing device.

20 Claims, 8 Drawing Sheets

(56) References Cited

U.S. PATENT DOCUMENTS

| | | |
|---|---|---|
| 2013/0030902 A1 | 1/2013 | Paschkes et al. |
| 2013/0041767 A1 | 2/2013 | Hollander et al. |
| 2013/0185129 A1 | 7/2013 | Berman et al. |
| 2013/0185135 A1 | 7/2013 | Mason |
| 2013/0197991 A1 | 8/2013 | Basu et al. |
| 2013/0226684 A1 | 8/2013 | Hammad et al. |
| 2013/0238408 A1 | 9/2013 | Cooke et al. |
| 2013/0268333 A1* | 10/2013 | Ovick ................ G06Q 30/0215 705/14.17 |
| 2014/0081737 A1 | 3/2014 | Gilman et al. |
| 2014/0164084 A1 | 6/2014 | Battles et al. |

OTHER PUBLICATIONS

International Search Report and Written Opinion, dated Mar. 13, 2015, for co-pending International patent application No. PCT/US2014/066415 (10 pgs.).

Australian Examination Report No. 1 for MasterCard International Incorporated Application No. 2014353057 dated Apr. 13, 2017, 5 pages.

\* cited by examiner

METHOD AND SYSTEM FOR PROCESSING A DISCOUNT

CROSS-REFERENCE TO RELATED APPLICATIONS

This patent application claims the benefit of U.S. Provisional Patent Application No. 61/906,582, filed Nov. 20, 2013, the entirety of which is incorporated herein by reference.

BACKGROUND

This description relates to processing financial transactions, and more particularly, to applying a discount to a purchase price of a product or service in a financial transaction processed by a payment network.

In known methods for processing payments initiated by a payment card holder (cardholder), the cardholder purchases a product or service from a merchant, and the merchant transmits an authorization request message for the purchase price to an acquirer who then transmits the authorization request through a payment network to an issuer bank. The issuer bank transmits an authorization response message back through the payment network to the acquirer, who then transmits the authorization response message to the merchant. Such known methods do not include communication with, for example, an "off network" computing device that determines whether one or more discounts may be applied to a purchase price of the product or service, adjusts the purchase price accordingly, and provides data for clearance and settlement after a discounted purchase price has been approved by an issuer associated with the cardholder.

BRIEF DESCRIPTION OF THE DISCLOSURE

In one aspect, a computer-implemented method for processing a discount is provided. The method is implemented using a payment processor computing device associated with a payment network. The method includes receiving, at the payment processor computing device, from a discount module computing device, a notification of an adjusted authorization amount for a transaction. The notification is received by the discount module computing device from an intercept node computing device at the time a cardholder makes a purchase. The method also includes receiving, at the payment processor computing device, an authorization request message including a non-adjusted authorization amount for the transaction, replacing the non-adjusted authorization amount with the adjusted authorization amount in the authorization request message, and transmitting the authorization request message to an issuer computing device.

In another aspect, a payment processor computing device for processing a discount is provided. The payment processor computing device includes a memory device and a processor coupled to the memory device. The payment processor computing device is associated with a payment network. The payment processor computing device is configured to receive, from a discount module computing device, a notification of an adjusted authorization amount for a transaction. The notification is received by the discount module computing device from an intercept node computing device at the time a cardholder makes a purchase. The payment processor computing device is additionally configured to receive an authorization request message including a non-adjusted authorization amount for the transaction, replace the non-adjusted authorization amount with the adjusted authorization amount in the authorization request message, and transmit the authorization request message to an issuer computing device.

In another aspect, a computer-readable storage medium having computer-executable instructions embodied thereon is provided. When executed by a payment processor computing device associated with a payment network and having at least one processor in communication with a memory, the computer-executable instructions cause the payment processor computing device to receive, from a discount module computing device, a notification of an adjusted authorization amount for a transaction. The notification is received by the discount module computing device from an intercept node computing device at the time a cardholder makes a purchase. The computer-executable instructions additionally cause the payment processor computing device to receive an authorization request message including a non-adjusted authorization amount for the transaction, replace the non-adjusted authorization amount with the adjusted authorization amount in the authorization request message, and transmit the authorization request message to an issuer computing device.

In another aspect, a computer-implemented method for processing a discount is provided. The method is implemented using an intercept node computing device. The method includes receiving, at the intercept node computing device, stock keeping unit (SKU) data and a non-adjusted authorization amount for a transaction associated with the SKU from a merchant computing device. The method additionally includes transmitting, by the intercept node computing device to a discount module computing device, a first notification including the SKU data and the non-adjusted authorization amount, receiving, from the discount module computing device, a second notification including an adjusted authorization amount associated with the transaction, causing an authorization request message to be transmitted to an acquirer computing device, wherein the authorization request message includes the non-adjusted authorization amount, and transmitting split settlement amounts to the merchant computing device, wherein the split settlement amounts include a first settlement amount pertaining to the adjusted authorization amount and a second settlement amount pertaining to an adjustment to the non-adjusted authorization amount.

In another aspect, an intercept node computing device for processing a discount is provided. The intercept node computing device includes a memory device and a processor coupled to the memory device. The intercept node computing device is configured to receive stock keeping unit (SKU) data and a non-adjusted authorization amount for a transaction associated with the SKU from a merchant computing device. The intercept node computing device is additionally configured to transmit, to a discount module computing device, a first notification including the SKU data and the non-adjusted authorization amount, receive, from the discount module computing device, a second notification associated with an adjusted authorization amount associated with the transaction, cause an authorization request message to be transmitted to an acquirer computing device, wherein the authorization request message includes the non-adjusted authorization amount, and transmit split settlement amounts to the merchant computing device, wherein the split settlement amounts include a first settlement amount pertaining to the adjusted authorization amount and a second settlement amount pertaining to an adjustment to the non-adjusted authorization amount.

In another aspect, a computer-readable storage medium having computer-executable instructions embodied thereon is provided. When executed by an intercept node computing device having at least one processor in communication with a memory, the computer-executable instructions cause the intercept node computing device to receive stock keeping unit (SKU) data and a non-adjusted authorization amount for a transaction associated with the SKU from a merchant computing device. Additionally, the computer-executable instructions cause the intercept node computing device to transmit, to a discount module computing device, a first notification including the SKU data and the non-adjusted authorization amount, receive, from the discount module computing device, a second notification including an adjusted authorization amount associated with the transaction, cause an authorization request message to be transmitted to an acquirer computing device, wherein the authorization request message includes the non-adjusted authorization amount, and transmit split settlement amounts to a merchant computing device, wherein the split settlement amounts include a first settlement amount pertaining to the adjusted authorization amount and a second settlement amount pertaining to an adjustment to the non-adjusted authorization amount.

In another aspect, a computer-implemented method for processing a discount is provided. The method is implemented using a discount module computing device. The method includes receiving, from an intercept node computing device, a first notification including a non-adjusted authorization amount and stock keeping unit (SKU) data, determining, by the discount module computing device, an adjusted authorization amount based at least in part on the non-adjusted authorization amount and the SKU data, transmitting a second notification to a payment processor computing device associated with a payment network, wherein the second notification includes the adjusted authorization amount, and transmitting a third notification to the intercept node computing device, wherein the third notification includes the adjusted authorization amount.

In another aspect, a discount module computing device for processing a discount is provided. The discount module computing device includes a memory device and a processor coupled to the memory device. The discount module computing device is configured to receive, from an intercept node computing device, a first notification including a non-adjusted authorization amount and stock keeping unit (SKU) data, determine an adjusted authorization amount based at least in part on the non-adjusted authorization amount and the SKU data, transmit a second notification to a payment processor computing device associated with a payment network, wherein the second notification includes the adjusted authorization amount, and transmit a third notification to the intercept node computing device, wherein the third notification includes the adjusted authorization amount.

In another aspect, a computer-readable storage medium having computer-executable instructions embodied thereon is provided. When executed by a discount module computing device having at least one processor in communication with a memory, the computer-executable instructions cause the discount module computing device to receive, from an intercept node computing device, a first notification including a non-adjusted authorization amount and stock keeping unit (SKU) data, determine an adjusted authorization amount based at least in part on the non-adjusted authorization amount and the SKU data, transmit a second notification to a payment processor computing device associated with a payment network, wherein the second notification includes the adjusted authorization amount, and transmit a third notification to the intercept node computing device, wherein the third notification includes the adjusted authorization amount.

BRIEF DESCRIPTION OF THE DRAWINGS

FIG. 1 is a schematic diagram illustrating an example multi-party payment card industry system for enabling payment-by-card transactions in which merchants and card issuers do not necessarily have a one-to-one relationship.

FIG. 2 is a simplified block diagram of an example discount processing system including a plurality of computing devices, including a merchant computing device, an intercept node computing device, and a discount module computing device, in accordance with one example embodiment of the present disclosure.

FIG. 3 is an expanded block diagram of an example embodiment of a server architecture of the discount processing system including the plurality of computing devices in accordance with one example embodiment of the present disclosure.

FIG. 4 illustrates an example configuration of a client system shown in FIGS. 2 and 3.

FIG. 5 illustrates an example configuration of a server system shown in FIGS. 2 and 3.

FIG. 6 is a data flow diagram of an example method of processing an adjusted authorization amount for a transaction.

FIG. 7 is a flowchart of an example process that may be performed by the discount processing system of FIGS. 2 and 3 for processing an adjusted authorization amount.

FIG. 8 is a diagram of components of one or more example computing devices that may be used in the discount processing system shown in FIGS. 2 and 3.

DETAILED DESCRIPTION OF THE DISCLOSURE

Figure 1:
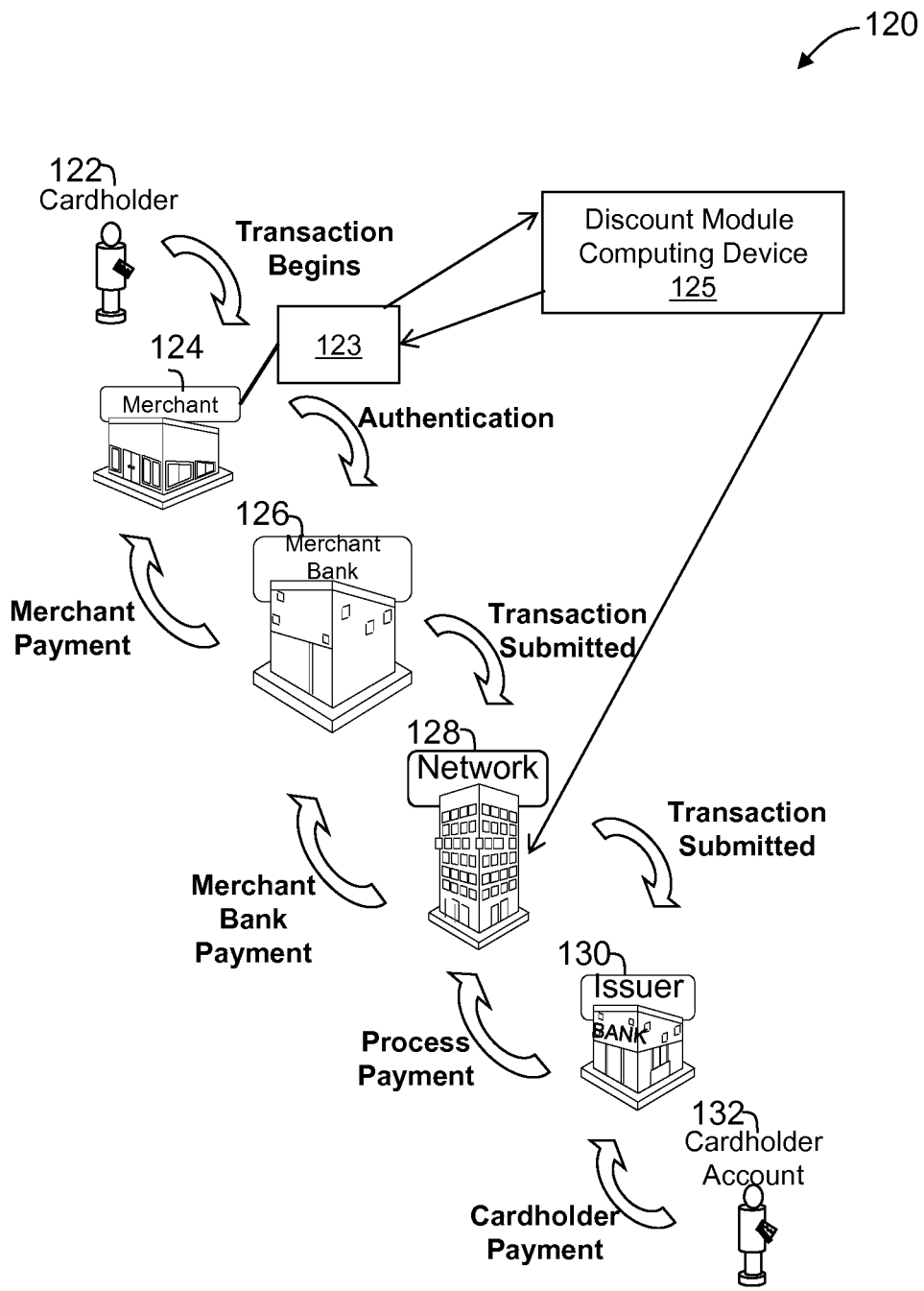
FIGS. 1-8 show example embodiments of the methods and systems described herein.

Systems and methods described herein enable applying adjustments, such as discounts, to transactions in real time or on-the-fly. More specifically, in implementations of systems and methods described herein, an intercept node computing device is coupled to or included within a merchant point-of-sale computing device (i.e., point-of-sale terminal), referred to herein as a "merchant computing device." When a payment card holder ("customer") purchases a product or service, the merchant computing device transmits stock keeping unit ("SKU") data identifying the product or service and a purchase price ("non-adjusted authorization amount") for the product or service to the intercept node computing device. The intercept node computing device transmits at least the SKU data and the non-adjusted authorization amount to a discount module computing device, which is in communication with a payment processor.

The discount module computing device determines an adjusted authorization amount (i.e., an adjusted price) based at least on the SKU data and the non-adjusted authorization amount, and transmits the adjusted authorization amount to the intercept node computing device. The discount module computing device also transmits at least the adjusted authorization amount to a payment processor computing device associated with a payment network. The intercept node computing device causes an authorization request message for the non-adjusted authorization amount to be transmitted to a computing device associated with an acquirer. The acquirer computing device transmits the authorization request to the payment processor computing device. The payment processor computing device modifies the authorization request message by replacing the non-adjusted authorization amount with the adjusted authorization amount received from the discount module computing device, and transmits the modified authorization request message to an issuer computing device. The issuer computing device transmits an authorization response message to the payment processor computing device. The authorization response message includes an authorization for the adjusted authorization amount.

The payment processor computing device transmits an authorization response message to the acquirer computing device, wherein the authorization response message includes an approval of a partial amount (i.e., the adjusted authorization amount, referred to herein as the "partial approval"). The acquirer computing device transmits the authorization response message to the intercept node computing device. The intercept node computing device transmits split settlement amounts to the merchant computing device. The split settlement amounts include a first settlement amount that pertains to the adjusted authorization amount and a second settlement amount that pertains to the adjustment to the non-adjusted authorization amount (e.g., a discount applied by the discount module computing device).

The merchant computing device may transmit a clearing record based on the adjusted authorization amount (also referred to herein as a "partial approval amount"), the payment processor computing device clears the adjusted approval amount with the issuer computing device, the discount module computing device settles the adjustment (e.g., discount) to the non-adjusted authorization amount, and the acquirer computing device settles the transaction based on the adjusted authorization amount.

The methods and systems described herein may be implemented using computer programming or engineering techniques including computer software, firmware, hardware or any combination or subset thereof, wherein at least one technical effect is achieved by performing at least one of: (a) receiving, by a payment processor computing device, from a discount module computing device, a notification of an adjusted authorization amount for a transaction, wherein the notification is received by the discount module computing device from an intercept node computing device at the time a cardholder makes a purchase; (b) receiving, by the payment processor computing device, an authorization request message including a non-adjusted authorization amount for the transaction; (c) replacing the non-adjusted authorization amount with the adjusted authorization amount in the authorization request message; and (d) transmitting the authorization request message to an issuer computing device. The technical effects described herein apply to the technical field of applying adjustments such as discounts or credits to transactions as they are being processed in a payment network (e.g., on-the-fly). The systems and methods described herein provide the technical advantage of automatically determining whether one or more discounts may be applied to a purchase price of a product or service, adjusting the purchase price accordingly, and providing data for clearance and settlement after the discounted purchase price has been approved by an issuer associated with an account holder who made the purchase. Accordingly, adjustments to purchase prices, due for example, to discounts and/or credits may be applied more efficiently than in conventional systems. More specifically, by replacing a non-adjusted authorization amount with an adjusted authorization amount at the payment processor while a transaction is being processed, the described systems and methods eliminate the need to process a first payment transaction for an original amount and then process a subsequent payment transaction for an adjustment (e.g., credit or discount) to the purchase price. Additionally, a cardholder making a purchase is not required to manage or otherwise keep track of coupons or other discounts or credits that may be applied to purchases.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, smartphones, personal digital assistants (PDAs), key fobs, and/or computers. Each type of transaction card can be used as a method of payment for performing a transaction.

In one embodiment, a computer program is provided, and the program is embodied on a computer-readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example multi-party payment card system 120 for enabling payment-by-card transactions in which merchants and card issuers do not necessarily have a one-to-one relationship. The present disclosure relates to payment card system 120, such as a credit card payment system using the MasterCard® payment card system payment network 128 (also referred to as an "interchange" or "interchange network"). MasterCard® payment card system payment network 128 is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

In payment card system 120, a financial institution such as an issuer 130 issues a payment account card, such as a credit card account or a debit card account, to a cardholder 122, who uses the payment account card to tender payment for a purchase from a merchant 124. To accept payment with the payment account card, merchant 124 must normally establish an account with a financial institution that is part of the financial payment system. This financial institution is usually called the "merchant bank" or the "acquiring bank" or "acquirer bank" or simply "acquirer". When a cardholder 122 tenders payment for a purchase with a payment account card (also known as a financial transaction card), merchant 124 transmits stock keeping unit ("SKU") data and a non-adjusted authorization request amount (non-adjusted price) to an intercept node computing device 123. Intercept node computing device 123 transmits the SKU data and the non-adjusted request amount to a discount module computing device 125.

Discount module computing device 125 determines an adjusted authorization request amount based at least in part on the SKU data and the non-adjusted authorization amount and transmits the adjusted authorization amount to intercept node computing device 123. Discount module computing device 125 also transmits the adjusted authorization amount to payment network 128. Intercept node computing device 123 causes a request for authorization to be transmitted to acquirer 126 for the non-adjusted authorization amount (i.e., the non-adjusted price). That is, the intercept node computing device 123 may transmit the authorization request itself or it may instruct merchant 124 to transmit the authorization request. When the merchant transmits the authorization request, the request may be performed over the telephone, but it usually is performed through the use of a point-of-interaction terminal ("merchant computing device"), which reads the cardholder's account information from the magnetic stripe on the payment account card and communicates electronically with the transaction processing computers of acquirer 126. Alternatively, acquirer 126 may authorize a third party to perform transaction processing on its behalf. In this case, the point-of-interaction terminal will be configured to communicate with the third party. Such a third party is usually called a "merchant processor" or an "acquiring processor."

Using payment card system payment network 128, the computers of acquirer 126 or the merchant processor will communicate with the computers of issuer 130, to determine whether the cardholder's account 132 is in good standing and whether the purchase is covered by the cardholder's available credit line or account balance. In some implementations, a server system ("payment processor computing device") of payment network 128 matches the adjusted authorization amount received from discount module computing device 125 with the received authorization request and replaces the non-adjusted authorization amount in the authorization request with the adjusted authorization amount, prior to transmitting the authorization request to computers of issuer 130. Based on these determinations, the request for authorization of the adjusted authorization amount will be declined or accepted by issuer 130. If the request is accepted, an authorization code for a partial authorization, (i.e., authorization for the adjusted authorization amount) is issued to merchant 124.

When a request for authorization is accepted by issuer 130, the available credit line or available balance of cardholder's account 132 is decreased. Normally, a charge is not posted immediately to a cardholder's account because bankcard associations, such as MasterCard International Incorporated®, have promulgated rules that do not allow a merchant to charge, or "capture," a transaction until goods are shipped or services are delivered. When a merchant ships or delivers the goods or services, merchant 124 captures the transaction by, for example, appropriate data entry procedures on the point-of-interaction terminal. If a cardholder cancels a transaction before it is captured, a "void" is generated. If a cardholder returns goods after the transaction has been captured, a "credit" is generated.

For debit card transactions, when a request for authorization is approved by the issuer, the cardholder's account 132 is decreased. Normally, a charge is posted immediately to cardholder's account 132. The bankcard association then transmits the approval to the acquiring processor for distribution of goods/services, or information or cash in the case of an ATM.

After a transaction is captured, the transaction is settled between merchant 124, acquirer 126, and issuer 130. Settlement refers to the transfer of financial data or funds between the merchant's account, acquirer 126, and issuer 130 related to the transaction. Usually, transactions are captured and accumulated into a "batch," which is settled as a group. In payment card system 120, settlement includes settlement of the adjusted authorization amount as well as settlement of the portion of the non-adjusted authorization amount that was not included in the adjusted authorization amount (e.g., a discount or credit), as described herein.

Figure 2:
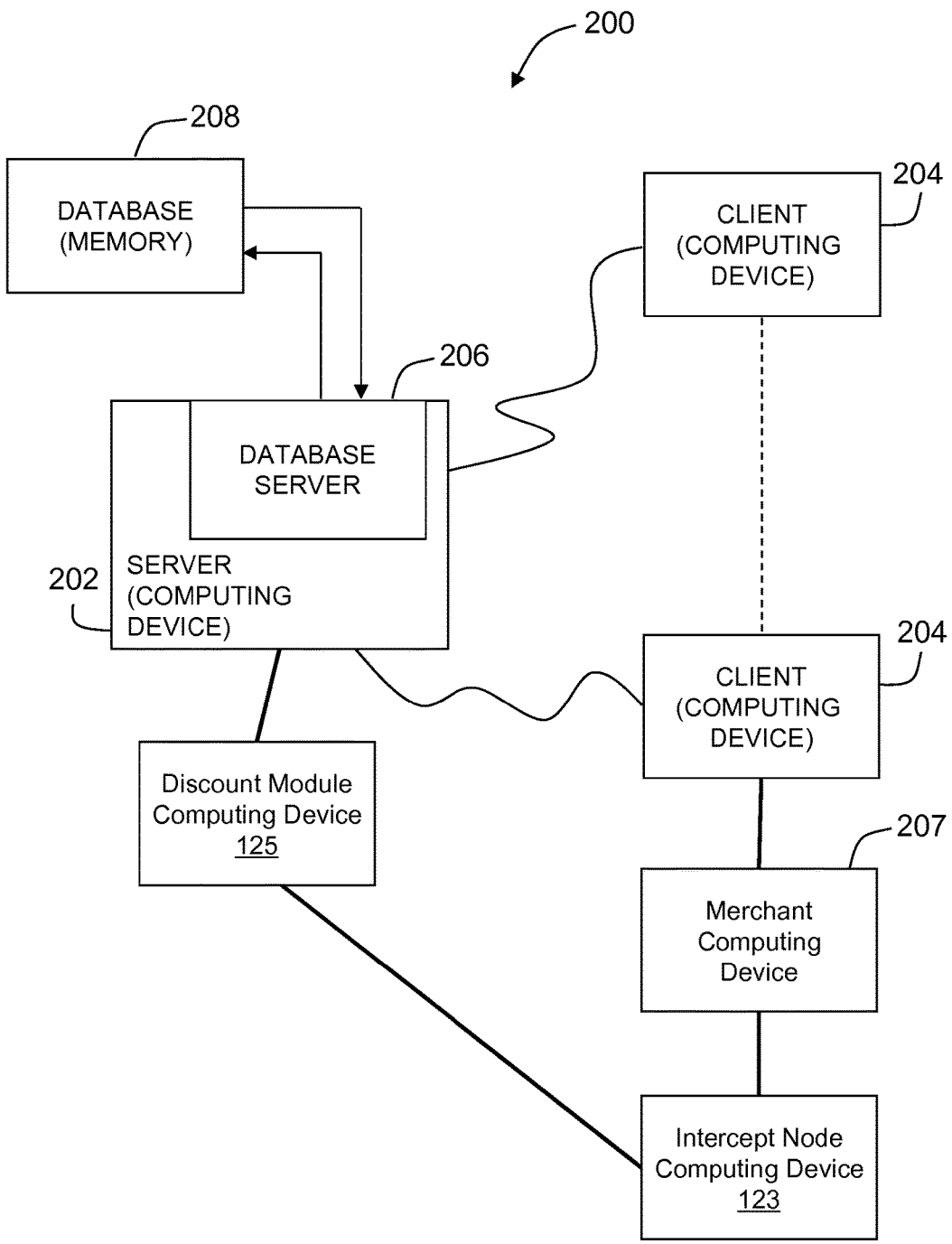

FIG. 2 is a simplified block diagram of an example discount processing system 200 in accordance with one embodiment of the present disclosure. In the example embodiment, system 200 includes a server system 202 and a plurality of client subsystems, also referred to as client systems 204 or client computing devices, connected to server system 202. In one embodiment, client systems 204 are computers including a web browser, such that server system 202 is accessible to client systems 204 using the Internet. Client systems 204 are interconnected to the Internet through many interfaces including a network, such as a local area network (LAN) and/or a wide area network (WAN), dial-in connections, cable modems, wireless-connections, and special high-speed ISDN lines. Client systems 204 may be any device capable of interconnecting to the Internet including a web-based phone, personal digital assistant (PDA), or other web-connectable equipment. A database server 206 is connected to a database 208 containing information on a variety of matters, as described below in greater detail. In one embodiment, database 208 is stored on server system 202 and may be accessed by potential users at one of client systems 204 by logging onto server system 202 through one of client systems 204. In any alternative embodiment, database 208 is stored remotely from server system 202 and may be non-centralized. Server system 202 could be any type of computing device configured to perform the steps described herein. As discussed below, adjusted authorization amounts, non-adjusted authorization amounts, and cardholder account data are stored in database 208.

Figure 3:
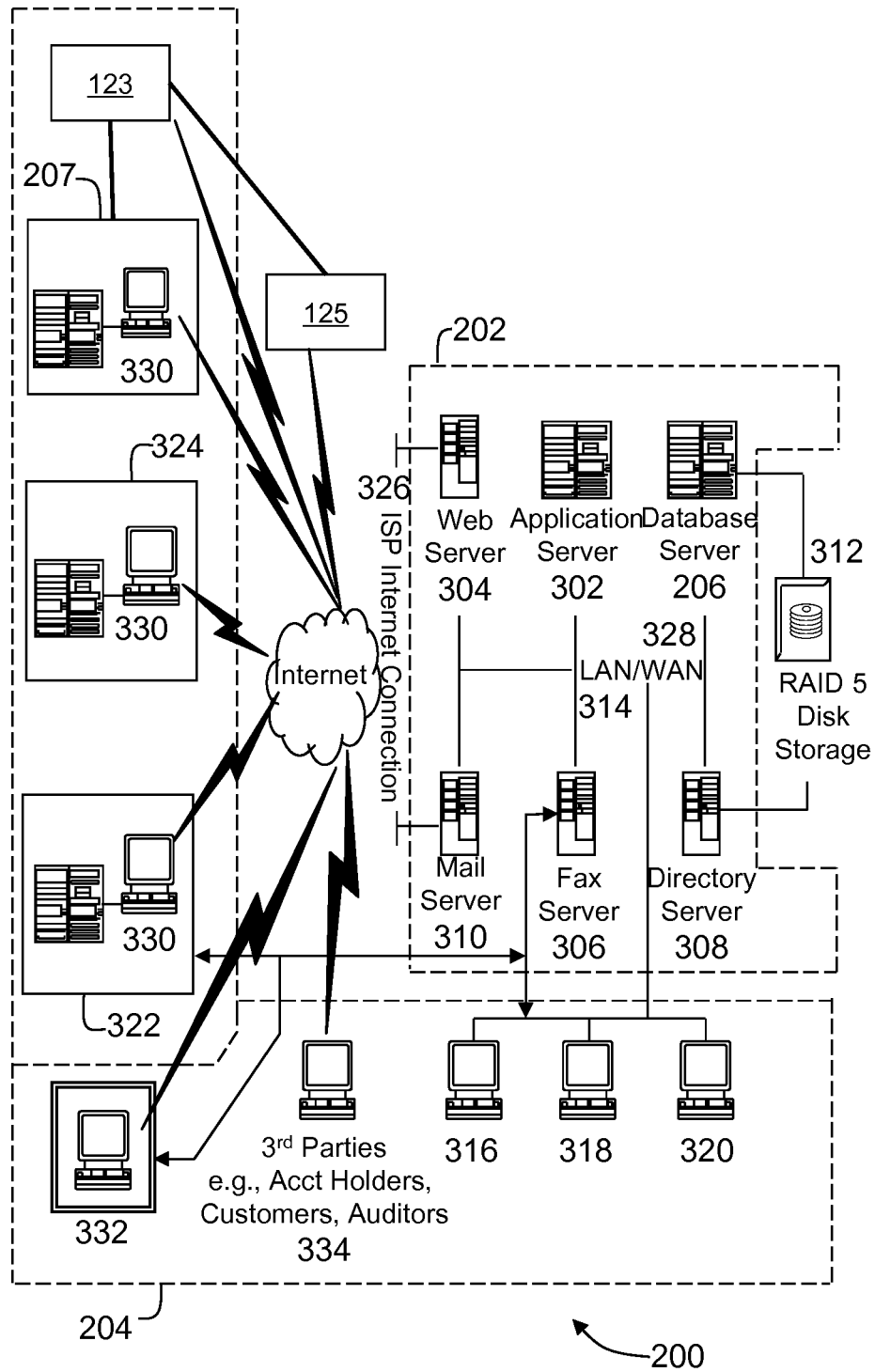

FIG. 3 is an expanded block diagram of an example embodiment of a server architecture of discount processing system 200 in accordance with one embodiment of the present disclosure. Discount processing system 200 includes server system 202 and client systems 204. Server system 202 further includes database server 206, an application server 302, a web server 304, a fax server 306, a directory server 308, and a mail server 310. A disk storage unit 312 is coupled to database server 206 and directory server 308. Servers 206, 302, 304, 306, 308, and 310 are coupled in a local area network (LAN) 314. In addition, a system administrator's workstation 316, a user workstation 318, and a supervisor's workstation 320 are coupled to LAN 314. Alternatively, workstations 316, 318, and 320 are coupled to LAN 314 using an Internet link or are connected through an Intranet.

Each workstation, 316, 318, and 320, is a personal computer having a web browser. Although the functions performed at the workstations typically are illustrated as being performed at respective workstations 316, 318, and 320, such functions can be performed at one of many personal computers coupled to LAN 314. Workstations 316, 318, and 320 are illustrated as being associated with separate functions only to facilitate an understanding of the different types of functions that can be performed by individuals having access to LAN 314.

Figure 4:
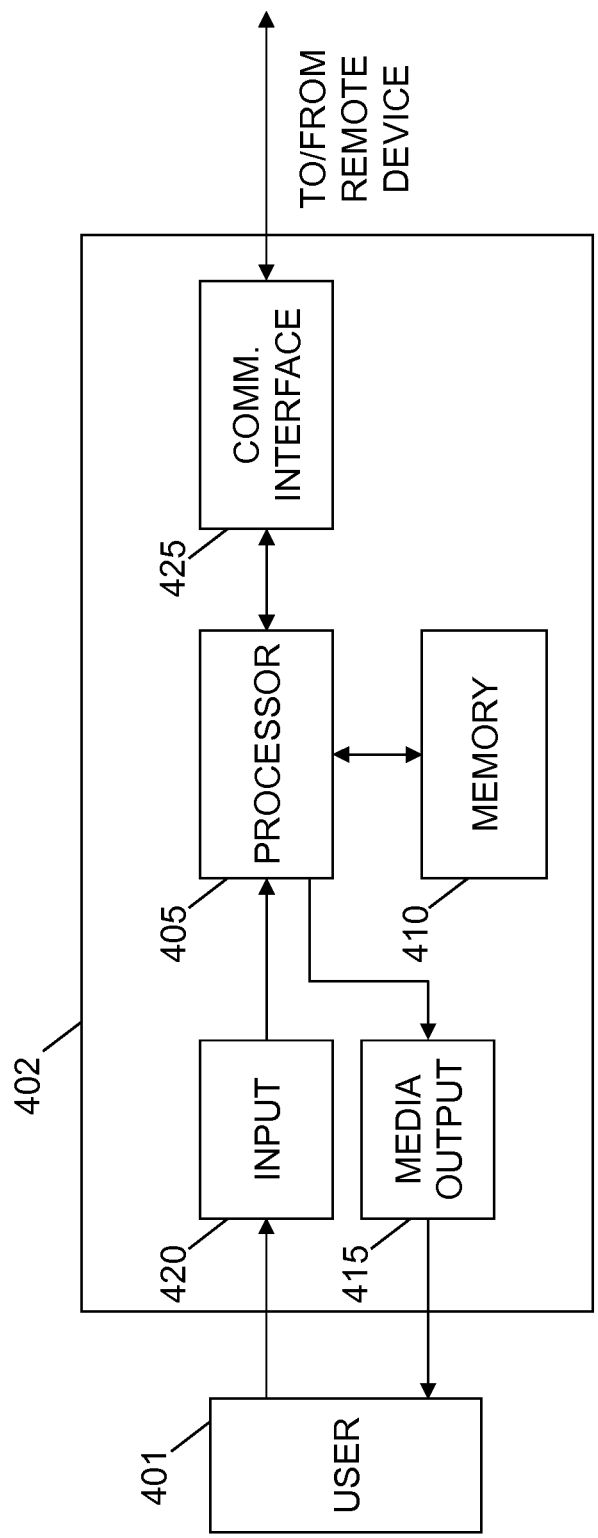

Server system 202 is configured to be communicatively coupled to various entities, including acquirers 322 and issuers 324, and to third parties, e.g., auditors, 334 using an Internet connection 326. Server system 202 is also communicatively coupled with a merchant 207. Merchant 207 is communicatively coupled to intercept node computing device 123. Intercept node computing device 123 is communicatively coupled to discount module computing device 125. Discount module computing device 125 is communicatively coupled to server system 202. In some implementations, intercept node computing device 123 is communicatively coupled to server system 202. In some implementations, intercept node computing device 123 is integrated within a computing device of merchant 207. In some implementations, discount module computing device 125 is included within server system 202. In other implementations, discount module computing device 125 is external to server system 202 and is operated by a third party. In some implementations, discount module computing device 125 is a cardholder computing device 402 (e.g., a smartphone) (FIG. 4). As described herein, communication among devices may occur over any form of wireless or wired connection. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 328, local area network 314 could be used in place of WAN 328.

In the example embodiment, any authorized individual or entity having a workstation 330 may access system 200. At least one of the client systems includes a manager workstation 332 located at a remote location. Workstations 330 and 332 include personal computers having a web browser. Also, workstations 330 and 332 are configured to communicate with server system 202. Furthermore, fax server 306 communicates with remotely located client systems, including a client system 332, using a telephone link. Fax server 306 is configured to communicate with other client systems 316, 318, and 320 as well.

FIG. 4 illustrates an example configuration of a cardholder computing device 402 operated by a cardholder 401. In some implementations, discount module computing device 125 is a cardholder computing device 402. Additionally, client systems ("client computing devices") 204, 316, 318, and 320, workstation 330, and manager workstation 332 (shown in FIG. 3), and intercept node computing device 123 may include similar components to cardholder computing device 402.

Cardholder computing device 402 includes a processor 405 for executing instructions. In some embodiments, executable instructions are stored in a memory area 410. Processor 405 may include one or more processing units (e.g., in a multi-core configuration). Memory area 410 is any device allowing information such as executable instructions and/or other data to be stored and retrieved. Memory area 410 may include one or more computer-readable media.

Cardholder computing device 402 also includes at least one media output component 415 for presenting information to cardholder 401. Media output component 415 is any component capable of conveying information to cardholder 401. In some embodiments, media output component 415 includes an output adapter such as a video adapter and/or an audio adapter. An output adapter is operatively coupled to processor 405 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, cardholder computing device 402 includes an input device 420 for receiving input from cardholder 401. Input device 420 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 415 and input device 420.

Cardholder computing device 402 may also include a communication interface 425, which is communicatively couplable to a remote device such as server system 202 or a web server operated by a merchant. Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 410 are, for example, computer-readable instructions for providing a user interface to cardholder 401 via media output component 415 and, optionally, receiving and processing input from input device 420. A user interface may include, among other possibilities, a web browser and client application. Web browsers enable cardholders, such as cardholder 401, to display and interact with media and other information typically embedded on a web page or a website from server system 202 or a web server associated with a merchant. A client application allows cardholder 401 to interact with a server application from server system 202 or a web server associated with a merchant.

Figure 5:
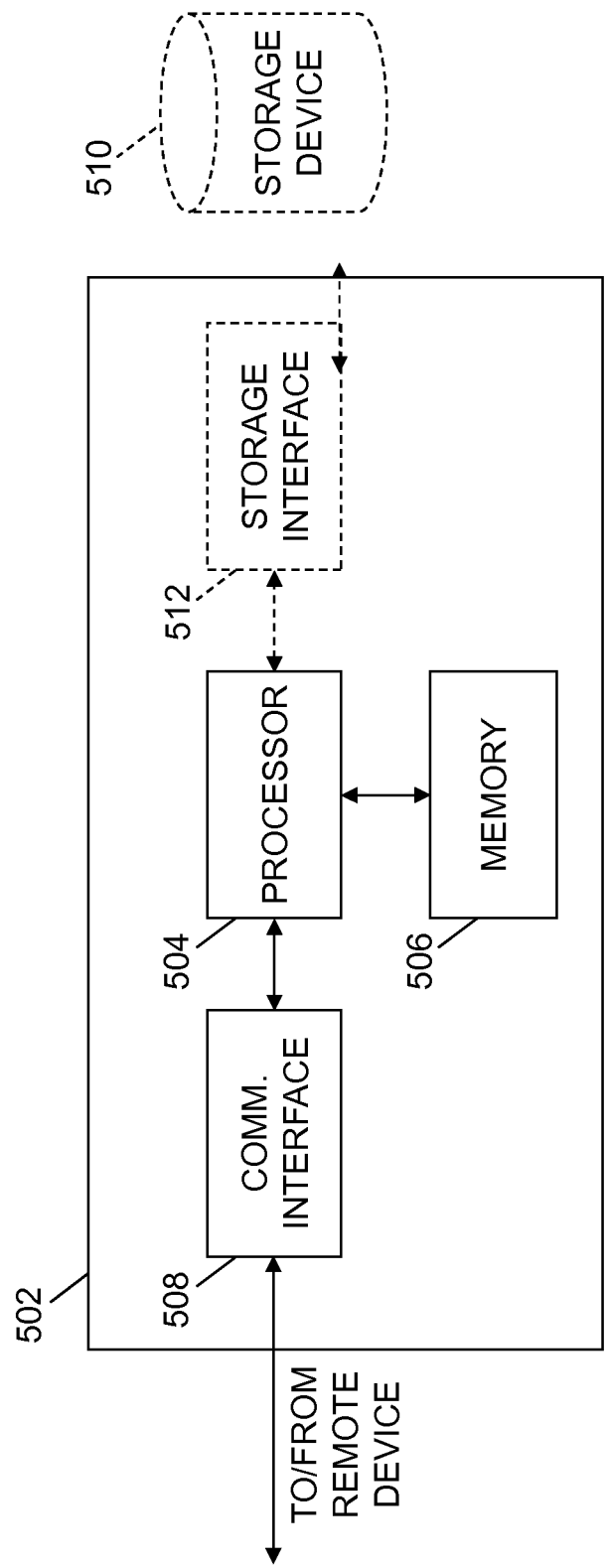

FIG. 5 illustrates an example configuration of a server computing device 502 such as server system 202 (shown in FIGS. 2 and 3). Server computing device 502 may include, but is not limited to, database server 206, application server 302, web server 304, fax server 306, directory server 308, and mail server 310. In some implementations, discount module computing device 125 includes components that are similar to components of server computing device 502.

Server computing device 502 includes a processor 504 for executing instructions. Instructions may be stored in a memory area 506, for example. Processor 504 may include one or more processing units (e.g., in a multi-core configuration).

Processor 504 is operatively coupled to a communication interface 508 such that server computing device 502 is capable of communicating with a remote device such as cardholder computing device 402 or another server computing device 502. For example, communication interface 508 may receive requests from client systems 204 via the Internet, as illustrated in FIGS. 2 and 3.

Processor 504 may also be operatively coupled to a storage device 510. Storage device 510 is any computer-operated hardware suitable for storing and/or retrieving data. In some embodiments, storage device 510 is integrated in server computing device 502. For example, server computing device 502 may include one or more hard disk drives as storage device 510. In other embodiments, storage device 510 is external to server computing device 502 and may be accessed by a plurality of server computing devices 502. For example, storage device 510 may include multiple storage units such as hard disks or solid state disks in a redundant array of inexpensive disks (RAID) configuration. Storage device 510 may include a storage area network (SAN) and/or a network attached storage (NAS) system.

In some embodiments, processor 504 is operatively coupled to storage device 510 via a storage interface 512. Storage interface 512 is any component capable of providing processor 504 with access to storage device 510. Storage interface 512 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 504 with access to storage device 510.

Memory areas 410 and 506 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 6:
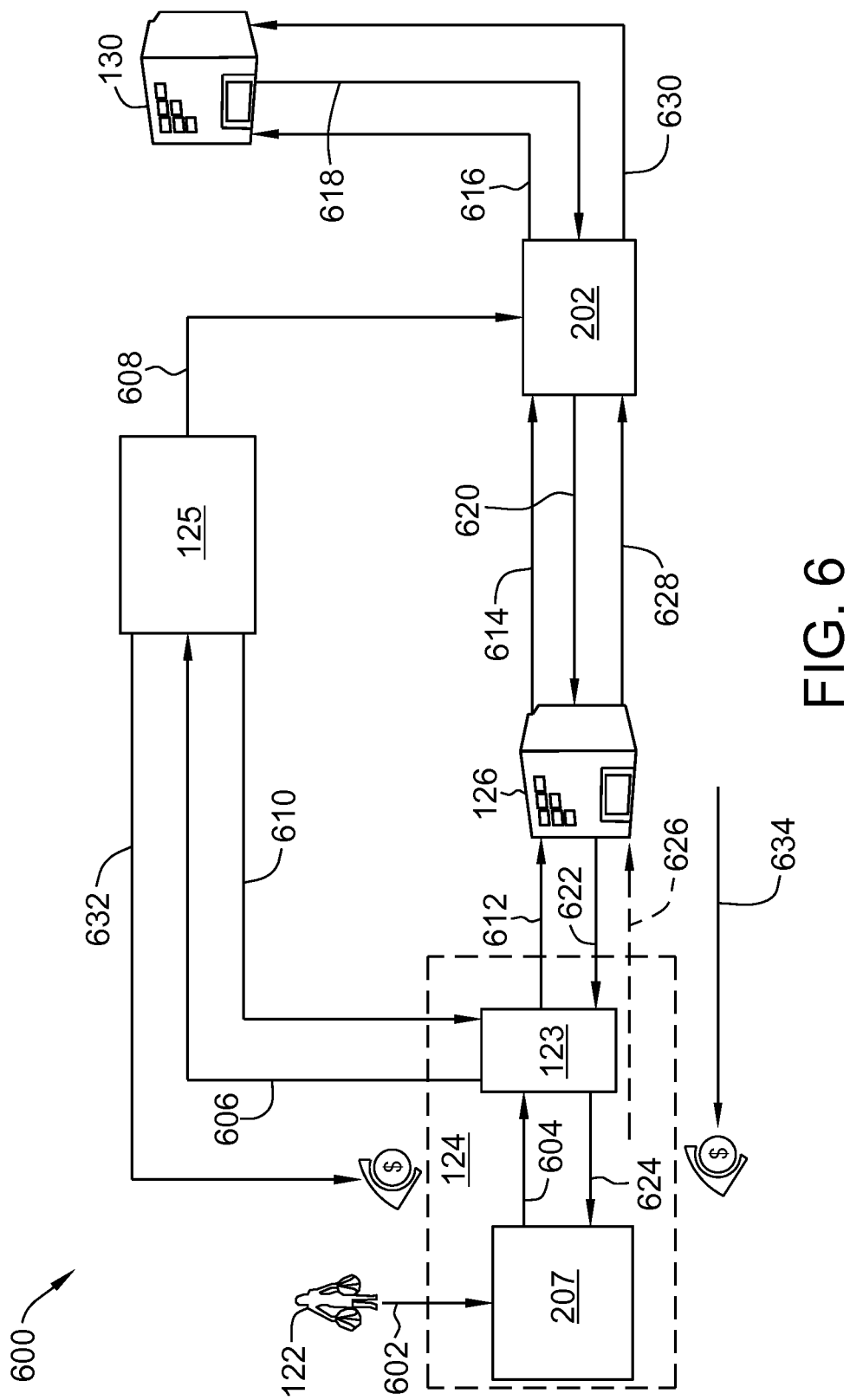

FIG. 6 is a data flow diagram 600 of an example method of processing an adjusted authorization amount for a transaction. Cardholder 122 purchases 602 a product or service having a SKU, or other product identifier, and a purchase price. A merchant computing device 207 (e.g., point-of-sale terminal) transmits 604 the purchase price ("non-adjusted authorization amount") and SKU to intercept node computing device 123. In some implementations, intercept node computing device 123 additionally transmits an identifier for the transaction, including, for example a cardholder account number or payment card number. In some implementations, intercept node computing device 123 is integrated into computing device 207 of merchant 124. In other implementations, intercept node computing device 123 is separate and communicatively coupled to computing device 207 of merchant 124.

Intercept node computing device 123 transmits 606 a first notification to discount module computing device 125 including at least the SKU (or other product identifier) and the non-adjusted authorization amount. In some implementations, intercept node computing device 123 additionally transmits a transaction identifier, for example an account number (e.g., payment card number) of cardholder 122, to discount module computing device 125. Discount module computing device 125 may be, for example, a server computing device of server system 202, a server computing device of a third party, a cardholder computing device (e.g., smartphone), or other computing device capable of performing the functions described herein. For example, discount module computing device 125 may store, in memory, at least one discount that may be applied to at least one SKU. For example, the discount may be 20% off of the purchase price of a product associated with the SKU. In some implementations, discount module computing device 125 may store one or more qualifiers in association with the SKU and the discount, for example a cardholder account number and a date or date range. For example, in some implementations, the qualifier may require that the purchase must be made by the cardholder associated with the cardholder account number stored by discount module computing device 125 and/or the purchase must take place by the date or within the date range stored by discount module computing device 125 in order for discount module computing device 125 to apply the discount to the purchase price ("non-adjusted authorization amount"). Accordingly, in such implementations, intercept node computing device 123 transmits such data (e.g., cardholder account number and/or purchase date) to discount module computing device 125. In some implementations, rather than applying a discount, discount module computing device 125 is configured to apply a credit. For example, the cardholder account identifier may be associated with one or more rewards, for example money (or cash equivalent credits), that may be applied to the purchase price ("non-adjusted authorization amount"). In either of the exemplary implementations, the discount or credit effectively changes (e.g., reduces) the original purchase price to a different (e.g., reduced) purchase price (i.e., an adjusted authorization amount). By applying the discount or credit to the purchase price (i.e., the non-adjusted authorization amount), discount module computing device 125 generates an adjusted authorization amount.

Discount module computing device 125 transmits 608 a second notification to server system 202 that includes at least the adjusted authorization amount. In some implementations, discount module computing device 125 also includes identifying information associated with the adjusted authorization amount in the second notification. For example, discount module computing device 125 may include the transaction identifier in the second notification. Additionally, discount module computing device 125 transmits 610 a third notification to intercept node computing device 123 that includes the adjusted authorization amount and, at least in some implementations, the transaction identifier. Intercept node computing device 123 causes an authorization request message to be transmitted 612 to acquirer 126 including the non-adjusted authorization amount. In some implementations, intercept node 123 receives the authorization request from merchant computing device 207 at step 604, holds the authorization request message until receiving the adjusted authorization amount in step 610, and transmits the authorization request message to acquirer 126 at step 612. In other implementations, rather than directly transmitting the authorization request message to acquirer 126, intercept node computing device 123 transmits an instruction to merchant computing device 207 to transmit the authorization request message to acquirer 126. Acquirer 126, and more specifically, acquirer computing device 322 (FIG. 3) transmits 614 the authorization request message to server system 202. Server system 202 matches the received authorization request message with the received adjusted authorization amount from step 608. For example, server system 202 may match the received authorization request message and the received adjusted authorization amount using the transaction identifier discussed above. Additionally, server system 202 replaces the non-adjusted authorization amount with the adjusted authorization amount in the authorization request message. In at least some implementations in which cardholder 122 uses a payment card that includes an EMV ("Europay MasterCard Visa") chip or other microchip that communicates with the merchant computing device 207 to generate a security cryptogram based at least in part on the original purchase amount (e.g., the non-adjusted authorization amount), server system 202 moves the non-adjusted authorization amount to an additional field of the modified authorization request message, for use by the issuer 130 in validating the cryptogram against the non-adjusted authorization amount. In at least some implementations, the cryptogram in such transactions is included in the authorization request message and the modified authorization request message, for example in data element ("DE") 55.

Next, server system 202 transmits 616 the modified authorization request message to issuer 130, and more specifically, computing device 324 (FIG. 3) of issuer 130. Issuer transmits 618 an authorization response message to server system 202. Server system 202 transmits 620 the authorization response message to acquirer 126 as a partial authorization (i.e., the authorization response message includes a partial authorization code). More specifically, since issuer 130 only authorized a portion of the purchase price (i.e., the adjusted authorization amount), server system 202 transmits the authorization response message including a partial authorization that pertains to the adjusted authorization amount.

Next, acquirer 126 transmits 622 the authorization response message to intercept node computing device 123. Intercept node computing device 123 transmits 624 split settlement amounts to merchant computing device 207 to complete the transaction and print a receipt. The receipt may include a notification that the original price was adjusted (e.g., that a discount was applied). More specifically, intercept node computing device 123 transmits the first settlement amount pertaining to the second authorization response message (i.e., the adjusted authorization amount) and second settlement amount pertaining to the discount or credit (i.e., the non-adjusted authorization amount minus the adjusted authorization amount) to merchant computing device 207. Accordingly, the first settlement amount and the second settlement amount, when combined, account for the full purchase price (i.e., non-adjusted authorization amount). In some implementations, multiple SKUs may be included in the transaction. In some implementations, discount module computing device 125 may apply multiple discounts and/or credits to generate the adjusted purchase price, and the multiple discounts and/or credits are accounted for in the second settlement amount. In other implementations, acquirer transmits 622 the second authorization response message directly to merchant computing device 207 rather than intercept node computing device 123 receiving the authorization response message and transmitting it to merchant computing device 207. In such implementations, intercept node computing device 123 still transmits the second settlement amount pertaining to the one or more discounts and/or credits to merchant computing device 207.

Additionally, in some implementations, merchant computing device 207 transmits 626 a clearing record based on the adjusted authorization amount ("partial approval amount") to acquirer 126. Acquirer 126 clears 628 the transaction based on the partial approval amount. Next, server system 202 clears 630 the partial approval amount with issuer 130. Additionally, discount module computing device 125 or an entity associated with discount module computing device 125 settles 632 the discount(s) and/or credit(s) that were applied by discount module computing device 125 to generate the adjusted authorization amount. Additionally, acquirer 126 settles 634 the transaction based on the partial approval amount (i.e., the adjusted authorization amount).

Figure 7:
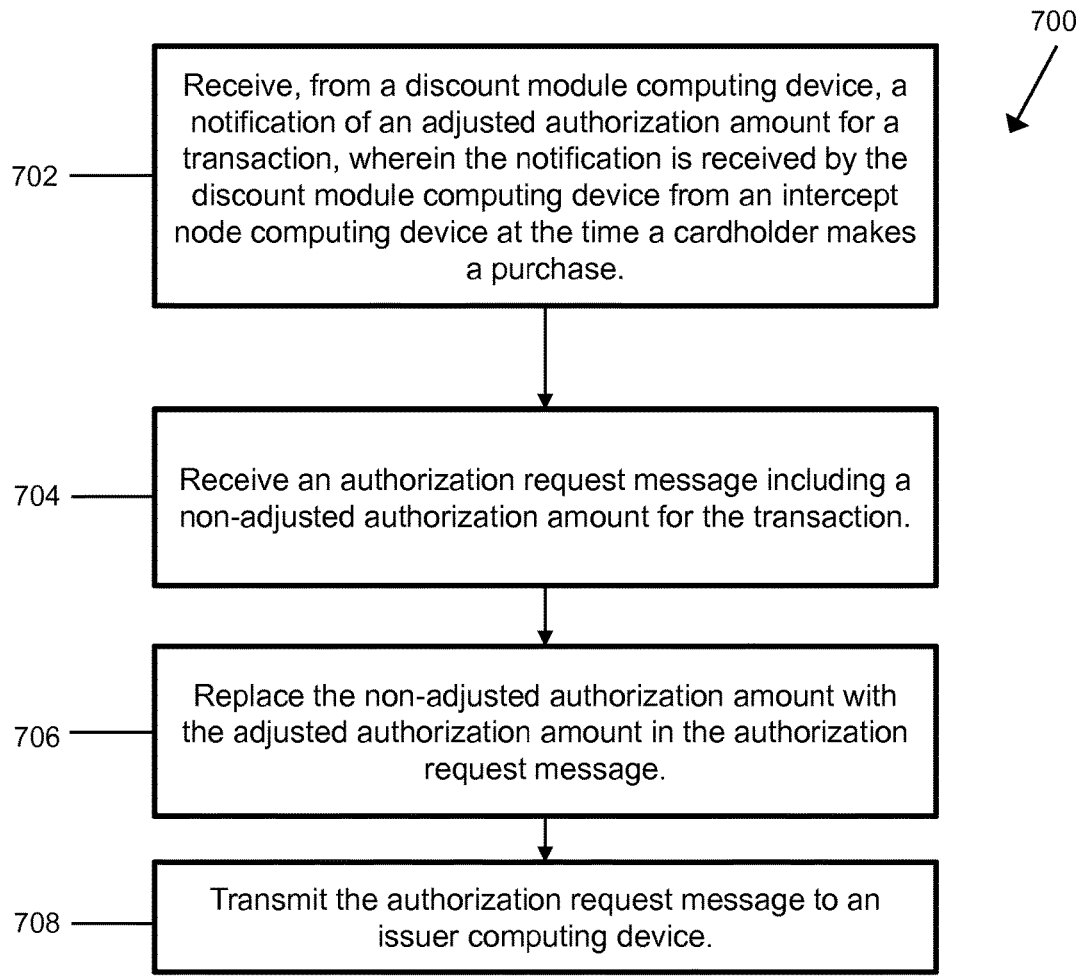

FIG. 7 is a flowchart of an example process 700 that may be performed by discount processing system 200 for processing an adjusted authorization amount. Initially, server system ("payment processor computing device") 202 receives 702, from discount module computing device 125, a notification of an adjusted authorization amount for a transaction. The notification is received by the discount module computing device 125 from an intercept node computing device 123 at the time a cardholder makes a purchase. Additionally, server system 202 receives 704 an authorization request message including a non-adjusted authorization amount for the transaction. Additionally, server system 202 replaces 706 the non-adjusted authorization amount with the adjusted authorization amount in the authorization request message. In addition, server system 202 transmits 708 the authorization request message to an issuer computing device 324. In some implementations, server system 202 additionally receives, from the issuer computing device 324, an authorization response message including an approval of the adjusted authorization amount. Additionally, server system 202 may transmit the authorization response message to an acquirer computing device 322, including a partial approval pertaining to the adjusted authorization amount.

Figure 8:
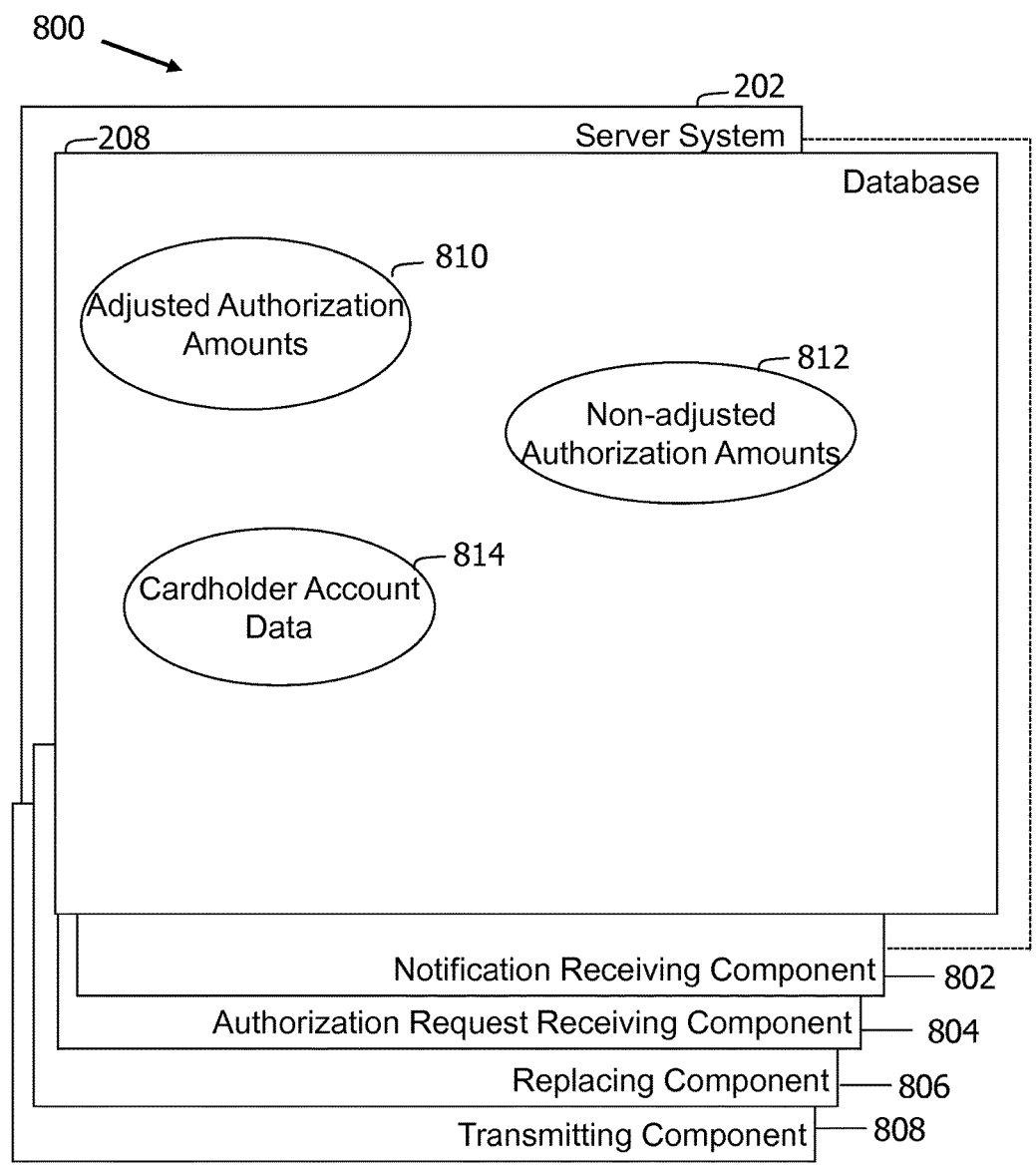

FIG. 8 is a diagram 800 of components of one or more example computing devices, for example, server system 202, that may be used in embodiments of the described systems and methods. FIG. 8 further shows a configuration of database 208 (FIG. 2). Database 208 is coupled to several separate components within server system 202, which perform specific tasks.

Server system 202 includes a notification receiving component 802 for receiving from discount module computing device 125 a notification of an adjusted authorization amount for a transaction. Server system 202 also includes an authorization request receiving component 804 for receiving an authorization request message including a non-adjusted authorization amount for the transaction. Server system 202 additionally includes a replacing component 806 for replacing the non-adjusted authorization amount with the adjusted authorization amount in the authorization request message. Additionally, server system 202 includes a transmitting component 808 for transmitting the authorization request message to an issuer computing device.

In an example embodiment, database 208 is divided into a plurality of sections, including but not limited to, an adjusted authorization amounts section 810, a non-adjusted authorization amounts section 812, and cardholder account data section 814. These sections within database 208 are interconnected to retrieve and store information in accordance with the functions and processes described above.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 405, 504, including RAM memory, ROM memory, EPROM memory, EEPROM memory, and non-volatile RAM (NVRAM) memory. The above memory types are example only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

The above-described embodiments of methods and systems enable applying adjustments, such as discounts or credits, to transactions in real time or on-the-fly. As a result, discounts and/or credits that are associated with a product or service and for which the cardholder qualifies, may be automatically applied to a payment card transaction to adjust the purchase price of the product or service, without requiring additional effort on the part of the cardholder.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-implemented method for processing a discount, said method implemented using a payment processor computing device associated with a payment network, said method comprising:
receiving, at a discount module computing device, a first notification associated with an authorization amount of a transaction from an intercept node computing device, wherein the first notification includes stock keeping unit (SKU) data and a non-adjusted authorization amount, the SKU data and the non-adjusted authorization amount received by the intercept node computing device from a merchant computing device;
determining, by the discount module computing device, an adjusted authorization amount for the transaction based at least in part on the non-adjusted authorization amount and the SKU data, the difference between the non-adjusted authorization amount and the adjusted authorization amount is a discount amount;
generating, by the discount module computing device, a second notification including the adjusted authorization amount;
receiving, at the payment processor computing device, from the discount module computing device, the second notification including the adjusted authorization amount;
receiving, at the intercept node computing device, from the discount module computing device, a third notification including the adjusted authorization amount;
causing, by the intercept node computing device, an authorization request message to be transmitted to an acquirer computing device, wherein the authorization request message includes the non-adjusted authorization amount;
receiving, at the payment processor computing device, the authorization request message from the acquirer computing device;
replacing, by the payment processor computing device, the non-adjusted authorization amount with the adjusted authorization amount in the authorization request message;
transmitting, by the payment processor computing device, the authorization request message including the adjusted authorization amount to an issuer computing device; and
transmitting, by the intercept node computing device, split settlement amounts to the merchant computing device, wherein the split settlement amounts include a first settlement amount that includes the adjusted authorization amount and a second settlement amount that includes the discount amount.

2. The method of claim 1, further comprising:
receiving from the issuer computing device, an authorization response message including an approval of the adjusted authorization amount; and
transmitting the authorization response message to the acquirer computing device including a partial approval pertaining to the adjusted authorization amount.

3. The method of claim 1, further comprising matching, by the payment processor computing device, the received authorization request message with the received adjusted authorization amount using a transaction identifier.

4. The method of claim 1, further comprising:
transmitting, by the discount module computing device, the second notification to the payment processor computing device; and
transmitting, by the discount module, a third notification to the intercept node computing device, wherein the third notification includes the adjusted authorization amount.

5. The method of claim 1, further comprising storing, by the discount module computing device, at least one discount amount associated with at least one stock keeping unit (SKU).

6. The method of claim 1, further comprising:
storing, by the discount module computing device, a first qualifier in association with an account number, the discount amount, and the SKU data, wherein the first qualifier specifies that the transaction must be associated with the account number and the SKU data for the discount amount to be applied; and determining the adjusted authorization amount includes determining that the transaction is associated with the account number and the SKU data, and applying the discount amount to the non-adjusted authorization amount.

7. The method of claim 6, further comprising storing, by the discount module computing device, a second qualifier in association with a date range, the discount amount, and the SKU data, wherein the second qualifier specifies that the transaction must be associated with the SKU data and must occur within the date range for the discount amount to be applied; and determining the adjusted authorization amount includes determining that the transaction is associated with the SKU data and occurred within the date range, and applying the discount amount to the non-adjusted authorization amount.

8. The method of claim 1, further comprising transmitting, by the discount module computing device, a transaction identifier associated with the transaction to at least one of the payment processor computing device and the intercept node computing device.

9. A system for processing a discount, said system comprising a payment processor computing device including a memory device and a processor coupled to said memory device, said payment processor computing device is associated with a payment network, said system configured to:
receive, at a discount module computing device, a first notification associated with an authorization amount of a transaction from an intercept node computing device, wherein the first notification includes stock keeping unit (SKU) data and a non-adjusted authorization amount, the SKU data and the non-adjusted authorization amount received by the intercept node computing device from a merchant computing device;
determine, by the discount module computing device, an adjusted authorization amount for the transaction based at least in part on the non-adjusted authorization amount and the SKU data, the difference between the non-adjusted authorization amount and the adjusted authorization amount is a discount amount;
generate, by the discount module computing device, a second notification including the adjusted authorization amount;
receive, at the payment processor computing device, from the discount module computing device, the second notification including the adjusted authorization amount;
receive, at the intercept node computing device, from the discount module computing device, a third notification including the adjusted authorization amount;
cause, by the intercept node computing device, an authorization request message to be transmitted to an acquirer computing device, wherein the authorization request message includes the non-adjusted authorization amount;
receive, at the payment processor computing device, the authorization request message from the acquirer computing device;
replace, by the payment processor computing device, the non-adjusted authorization amount with the adjusted authorization amount in the authorization request message;

transmit, by the payment processor computing device, the authorization request message including the adjusted authorization amount to an issuer computing device; and transmit, by the intercept node computing device, split settlement amounts to the merchant computing device, wherein the split settlement amounts include a first settlement amount that includes the adjusted authorization amount and a second settlement amount that includes the discount amount.

10. The system of claim 9, wherein said payment processor computing device is further configured to:
receive from the issuer computing device, an authorization response message including an approval of the adjusted authorization amount; and
transmit the authorization response message to the acquirer computing device including a partial approval pertaining to the adjusted authorization amount.

11. The system of claim 9, wherein said payment processor computing device is further configured to match the received authorization request message with the received adjusted authorization amount using a transaction identifier.

12. The system of claim 9, said system further comprising said discount module computing device, said discount module computing device configured to:
transmit the second notification to said payment processor computing device; and
transmit the third notification to the intercept node computing device, wherein the third notification includes the adjusted authorization amount.

13. The system of claim 9, said discount module computing device further configured to store at least one discount amount associated with at least one stock keeping unit (SKU).

14. The system of claim 9, said discount module computing device further configured to:
store a first qualifier in association with an account number, the discount amount, and the SKU data, wherein the first qualifier specifies that the transaction must be associated with the account number and the SKU data for the discount amount to be applied;
determine that the transaction is associated with the account number and the SKU data; and
apply the discount amount to the non-adjusted authorization amount.

15. The system of claim 14, said discount module computing device further configured to store a first qualifier in association with a date range, the discount amount, and the SKU data, wherein the second qualifier specifies that the transaction must be associated with the SKU data and must occur within the date range for the discount amount to be applied;
determine that the transaction is associated with the SKU data and occurred within the date range; and
apply the discount amount to the non-adjusted authorization amount.

16. The system of claim 9, said discount module computing device further configured to transmit a transaction identifier associated with the transaction to at least one of said payment processor computing device and the intercept node computing device.

17. An intercept node computing device for processing a discount, said intercept node computing device comprising a memory device and a processor coupled to said memory device, said intercept node computing device is configured to:

receive stock keeping unit (SKU) data and a non-adjusted authorization amount for a transaction from a merchant computing device;

transmit, to a discount module computing device, a first notification including the SKU data and the non-adjusted authorization amount, wherein the discount module computing device determines an adjusted authorization amount for the transaction based at least in part on the non-adjusted authorization amount and the SKU data and transmits, to a payment processor computing device, a second notification including the adjusted authorization amount;

receive, from the discount module computing device, a third notification including an adjusted authorization amount associated with the transaction;

cause an authorization request message to be transmitted to an acquirer computing device, wherein the authorization request message includes the non-adjusted authorization amount; and transmit split settlement amounts to the merchant computing device, wherein the split settlement amounts include a first settlement amount pertaining to the adjusted authorization amount and a second settlement amount pertaining to an adjustment to the non-adjusted authorization amount.

18. The intercept node computing device of claim 17, further configured to cause the authorization request message to be transmitted to the acquirer computing device by transmitting the authorization request message to the acquirer computing device directly.

19. The intercept node computing device of claim 18, further configured to hold the authorization request message until after said intercept node computing device has received the third notification including the adjusted authorization amount.

20. The intercept node computing device of claim 17, further configured to cause the authorization request message to be transmitted to the acquirer computing device by transmitting an instruction to the merchant computing device to transmit the authorization request message to the acquirer computing device.

* * * * *